United States Patent [19]

Szalvay

[11] Patent Number: 4,793,382
[45] Date of Patent: Dec. 27, 1988

[54] ASSEMBLY FOR REPAIRING A DAMAGED PIPE

[75] Inventor: Laszlo Szalvay, San Carlos, Calif.

[73] Assignee: Raychem Corporation, Menlo Park, Calif.

[21] Appl. No.: 133,753

[22] Filed: Dec. 16, 1987

Related U.S. Application Data

[63] Continuation-in-part of Ser. No. 65,146, Jun. 24, 1987, abandoned, which is a continuation of Ser. No. 596,743, Apr. 4, 1984, abandoned.

[51] Int. Cl.⁴ .............................................. F16L 55/16
[52] U.S. Cl. ...................... 138/98; 138/97; 29/447; 29/523; 29/402.09
[58] Field of Search ............. 138/89, 97, 98; 29/234, 29/235, 402.04, 447, 523, 423, 402.09, 507; 156/84, 294, 95; 425/383; 264/36, 229, 230, 267, 269; 72/370

[56] References Cited

U.S. PATENT DOCUMENTS

| 646,804 | 4/1900 | Clark. | |
|---|---|---|---|
| 1,471,184 | 10/1923 | Miles. | |
| 2,517,626 | 8/1950 | Berg | 138/97 |
| 2,731,041 | 1/1956 | Mueller et al. | 138/97 |
| 2,756,779 | 7/1956 | Tratzik et al. | 138/97 |
| 2,784,627 | 3/1957 | Mueller et al. | 81/55 |
| 2,829,675 | 4/1958 | Mueller et al. | 138/97 |
| 3,753,700 | 8/1973 | Harrison et al. | 75/175.5 |
| 3,900,939 | 8/1975 | Greacen | 29/401 |
| 4,069,573 | 1/1978 | Rogers, Jr. et al. | 29/421 R |
| 4,114,654 | 9/1978 | Richardson | 138/89 |
| 4,149,911 | 4/1979 | Clabburn | 148/11.5 R |
| 4,198,081 | 4/1980 | Harrison et al. | 285/381 |
| 4,294,559 | 10/1981 | Schutzler | 403/28 |
| 4,296,955 | 10/1981 | Martin | 285/381 |
| 4,355,664 | 10/1982 | Cook et al. | 138/110 |
| 4,368,571 | 1/1983 | Cooper, Jr. | 29/421 R |
| 4,410,391 | 10/1983 | Thomas et al. | 156/574 |
| 4,424,865 | 1/1984 | Payton, Jr. | 166/302 |
| 4,450,616 | 5/1984 | Morita | 29/446 |
| 4,485,847 | 12/1984 | Wentzell | 138/89 |
| 4,489,964 | 12/1984 | Kipp et al. | 285/374 |
| 4,502,896 | 3/1985 | Duerig et al. | 148/11.5 R |
| 4,505,767 | 3/1985 | Quin | 148/402 |
| 4,533,411 | 8/1985 | Melton | 148/402 |
| 4,581,801 | 4/1986 | Kobuck et al. | 29/157 |
| 4,631,094 | 12/1986 | Simpson et al. | 148/11.5 R |
| 4,713,870 | 12/1987 | Szalvay | 138/97 |

FOREIGN PATENT DOCUMENTS

A1177884 9/1964 Fed. Rep. of Germany.

OTHER PUBLICATIONS

U.S. patent application Ser. No. 668,771, Filed Nov. 6, 1984, by Simpson et al.

Primary Examiner—James E. Bryant, III
Attorney, Agent, or Firm—Simon J. Belcher; Herbert G. Burkard

[57] ABSTRACT

An assembly for securing a repair sleeve within a damaged pipe, comprising a tubular repair sleeve, and a shape memory alloy element positioned within the sleeve and having a mandrel on each end with at least a portion of each mandrel extending beyond the sleeve at a respective end of the sleeve, arranged so that when the shape memory alloy element recovers, the mandrels are moved towards one another so that each end portion of the sleeve is caused to expand outwardly.

7 Claims, 10 Drawing Sheets

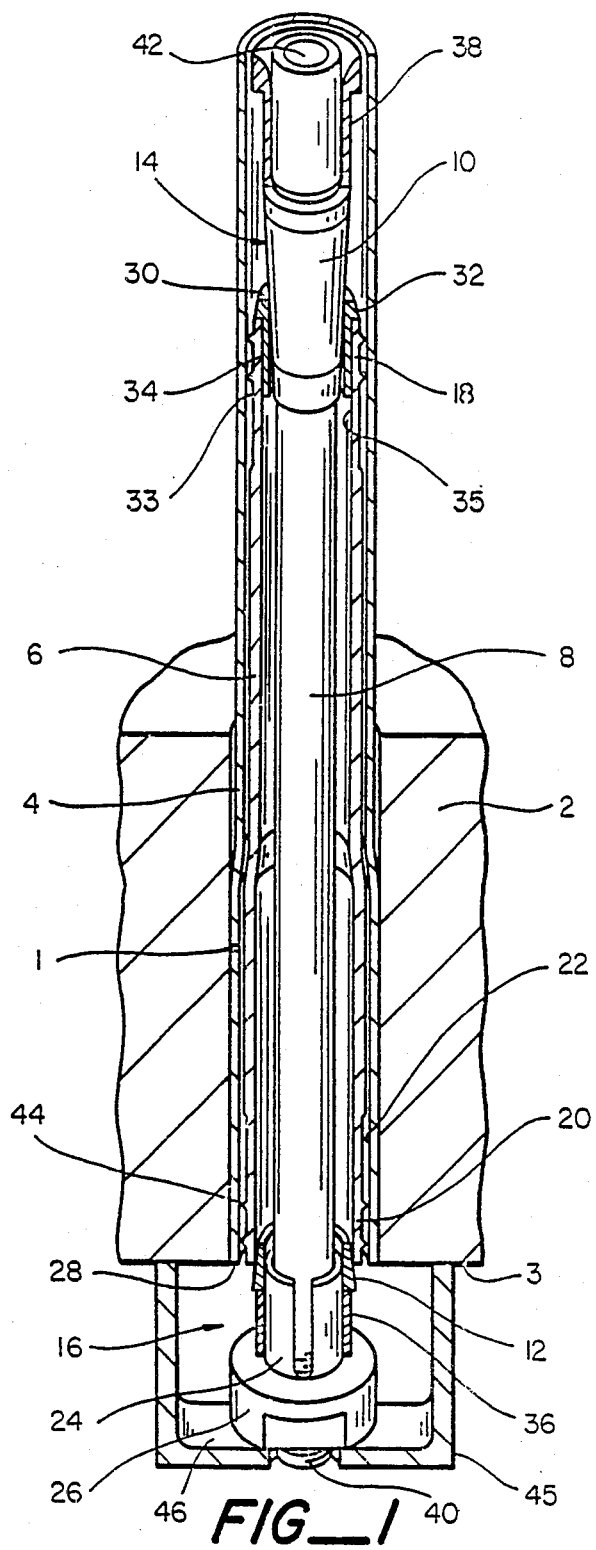
FIG_1

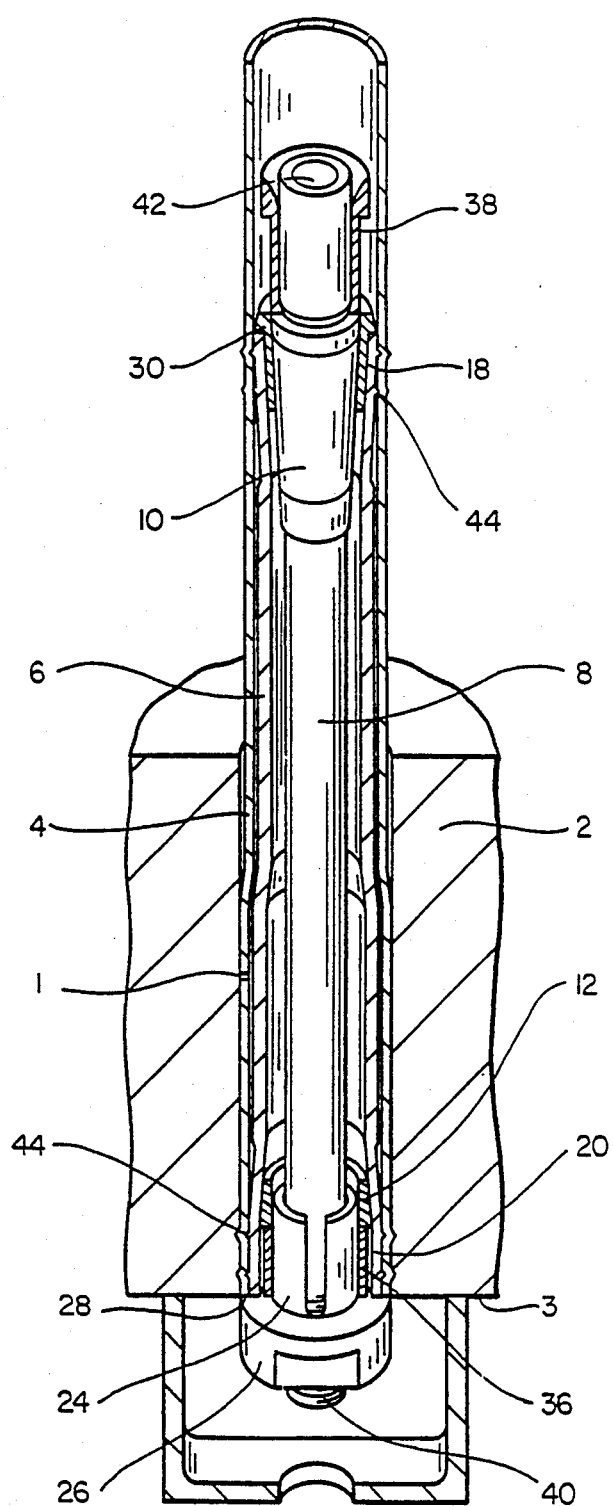
FIG_2

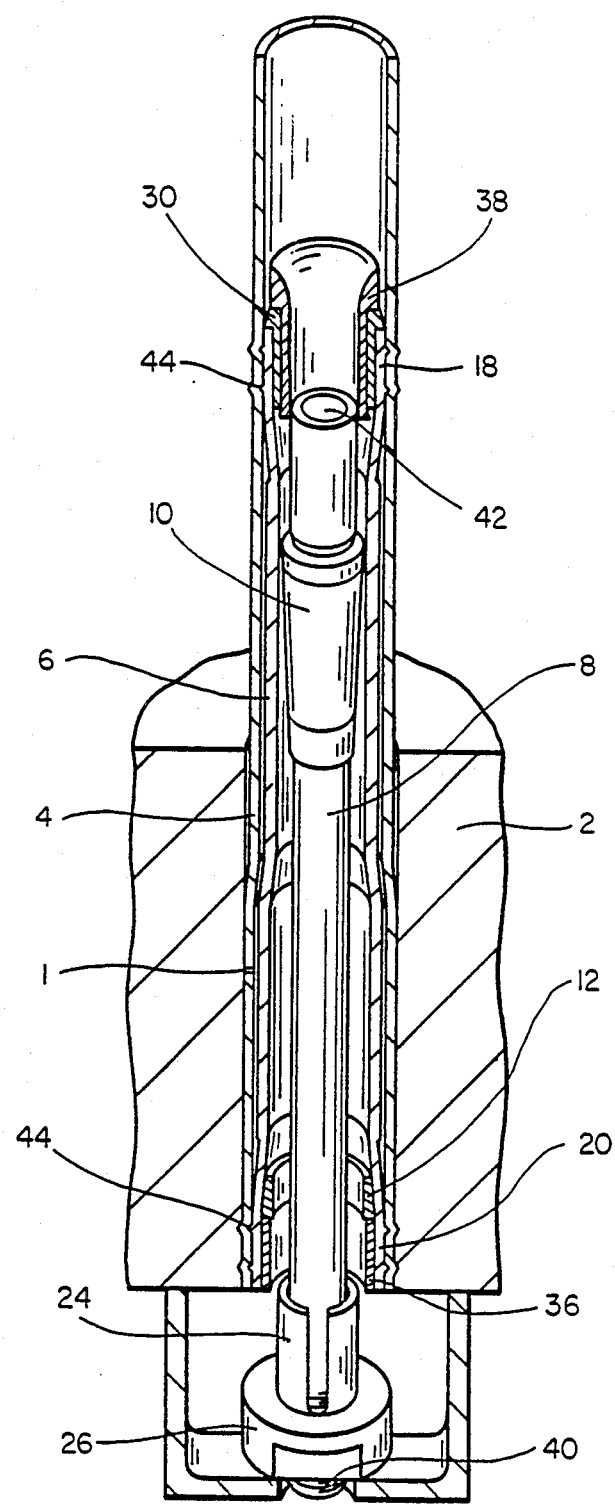
FIG_3

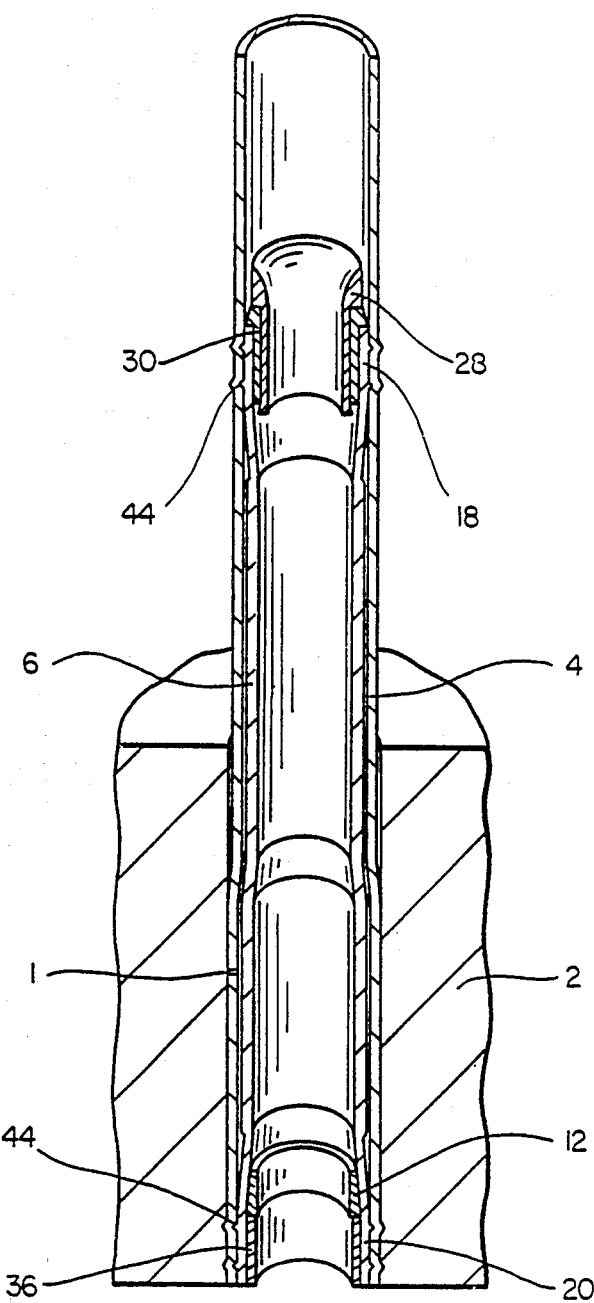
FIG_4

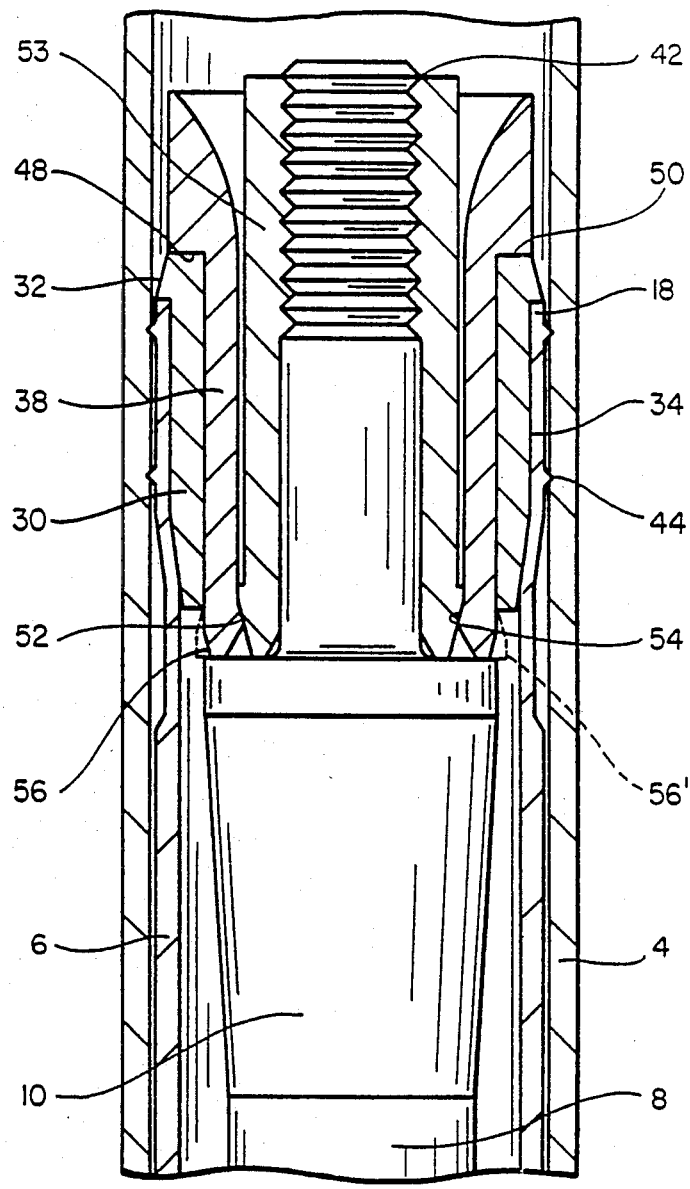
FIG_5

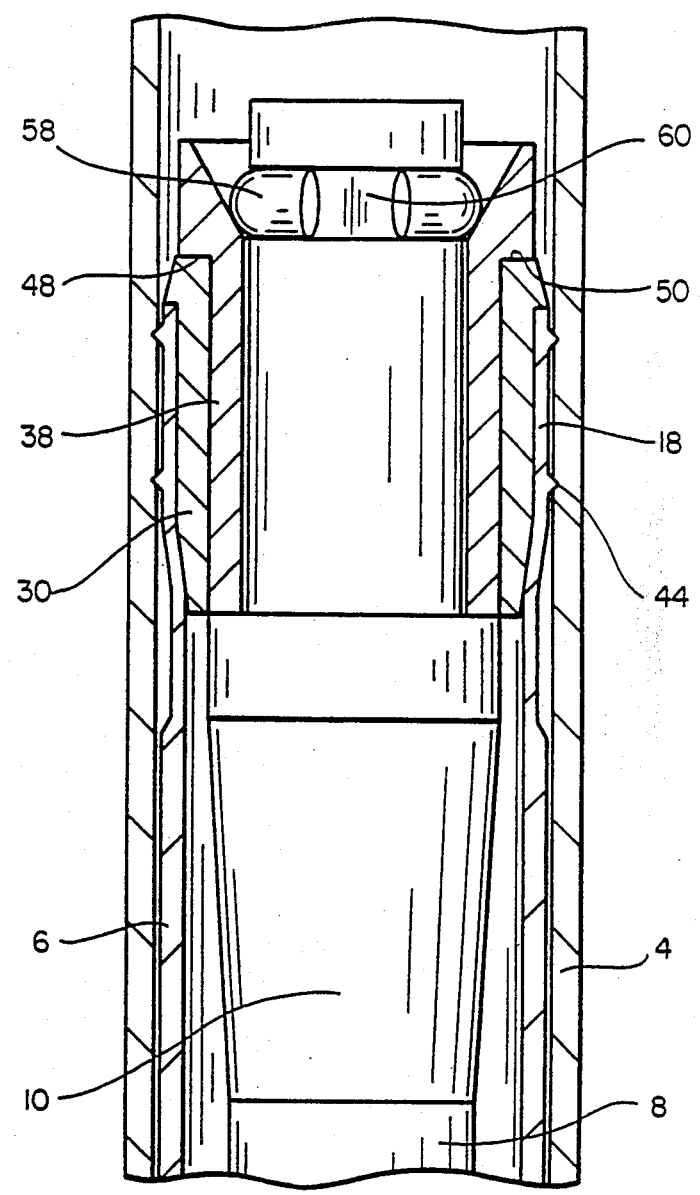
FIG_6

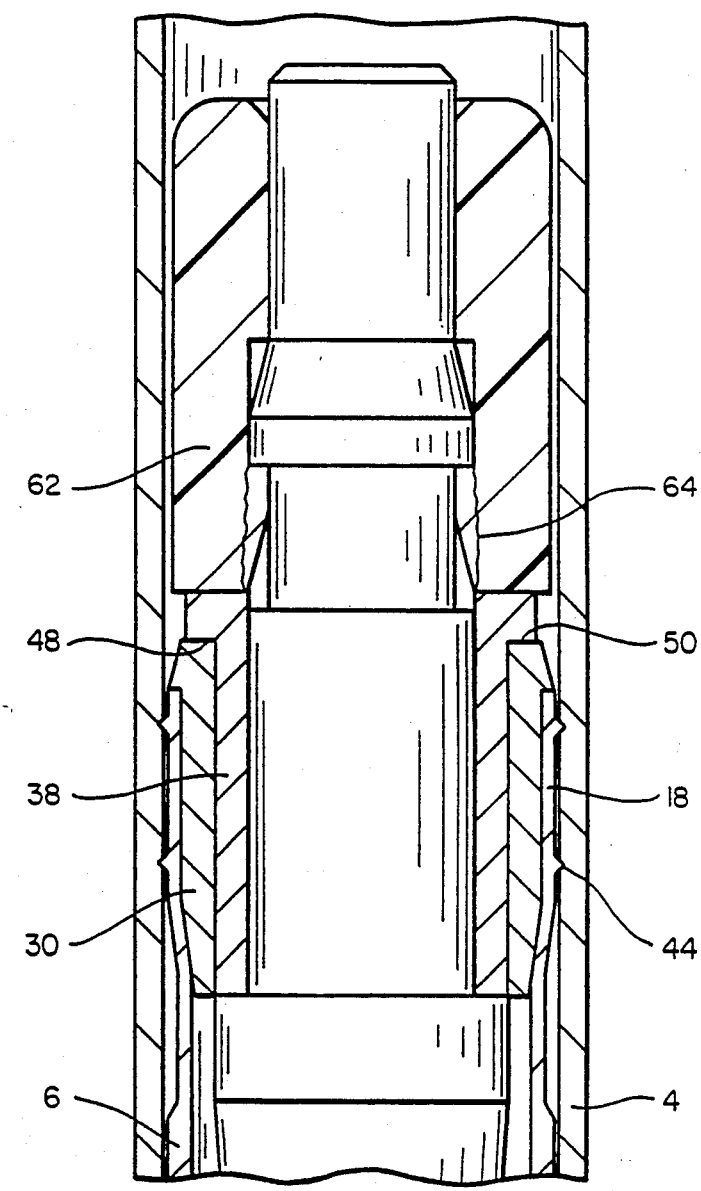
FIG_7

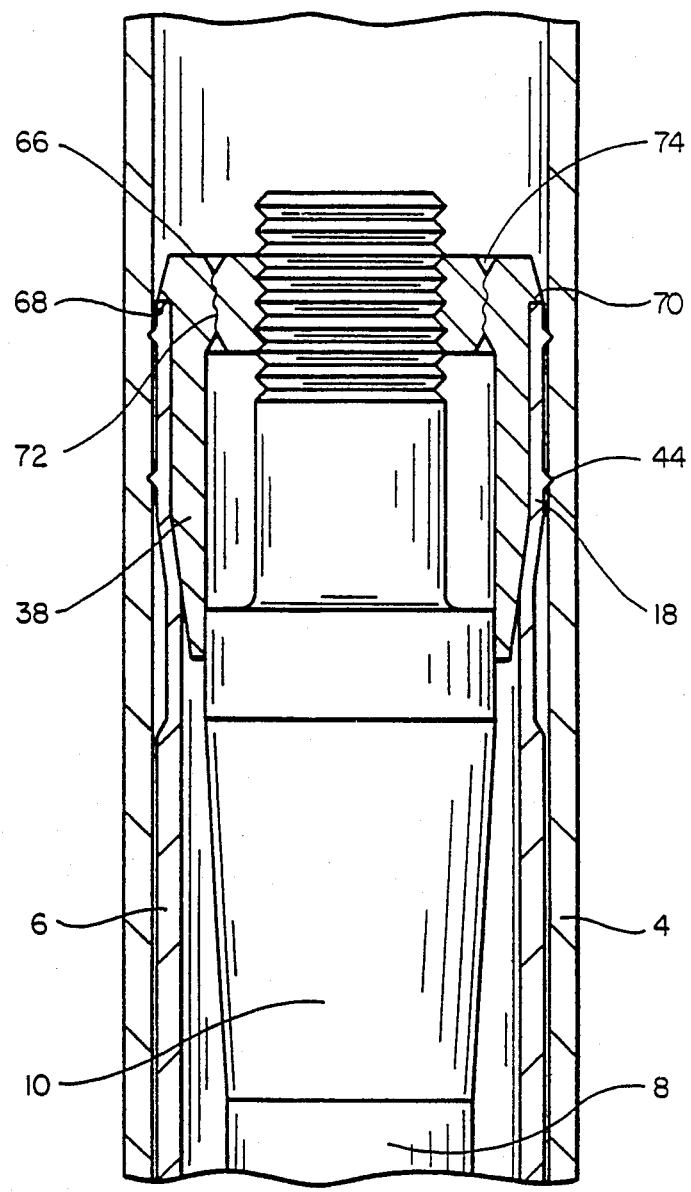
FIG_8

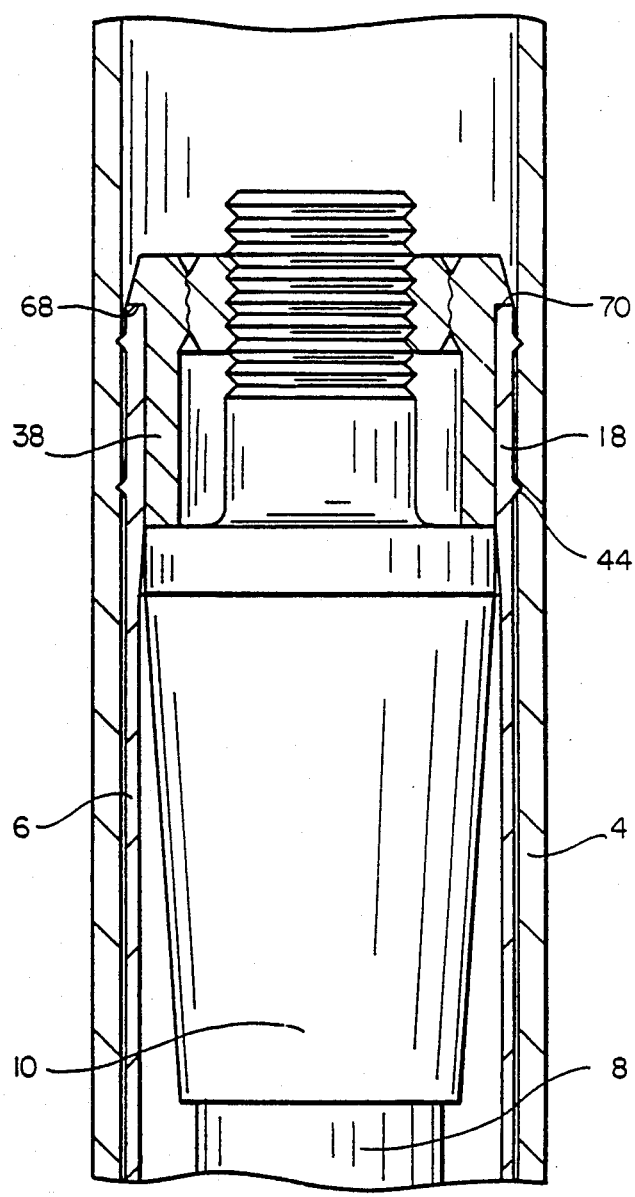
FIG_9

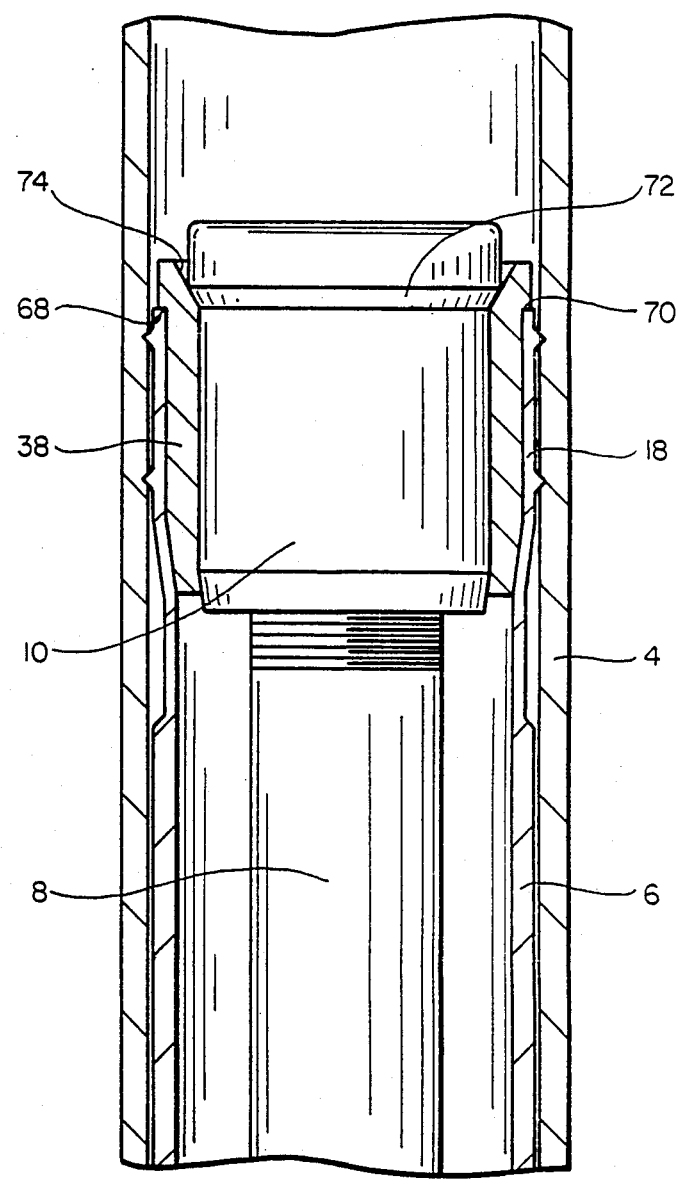
FIG_10

ASSEMBLY FOR REPAIRING A DAMAGED PIPE

CROSS-REFERENCE TO RELATED APPLICATIONS

This application is a continuation-in-part application of copending, commonly assigned application Ser. No. 65,146 filed June 24, 1987, now abandoned, which a continuation application of application Ser. No. 596,743 filed Apr. 4, 1984, now abandoned. The disclosure of each of those earlier applications is incorporated herein by reference.

BACKGROUND OF THE INVENTION

This invention relates generally to the repair of fluid carrying tubes such as those carrying natural gas, water or steam. More particularly, this invention has application to the repair of a steam generator.

Steam generators are an integral part of a power generating station. Over a period of time, the steam generator, or any fluid carrying tube for that matter, may develop leaks due to the combined corrosive effects of the fluid medium and the environment in which the steam generator or fluid carrying tube is situated. Whenever a leak is found, it must be stopped in some manner. One method is to plug the damaged tube. This method, of course, leads to reduced operating capacity. When enough damaged tubes become plugged, the power station must be shut down for retubing of the steam generator. Due to the time and expense involved, it would be desirable to avoid shutdown for as long as possible.

An alternative method is the repair in situ of the damaged tube. If the tube is repaired rather than plugged, operating capacity is not substantially reduced. A common embodiment of this alternative method is the insertion of a repair sleeve adjacent to the leak in the damaged pipe. When the repair sleeve is placed in position, it is desirable that it be firmly retained there. This is desirable for two reasons. The first is that any dislodgement of the repair sleeve would be totally unacceptable from the standpoint of the operation of the steam generator. The second is that firm retention promotes a leak-tight fit.

It is also desirable that the repair sleeve apparatus be capable of being deployed quickly and efficiently so as to avoid expensive labor costs. It is most desirable that the repair sleeve operation be subject to automation as by a remote manipulator.

Solutions as heretofore proposed in the prior art have failed to achieve these aims.

In U.S. Pat. No. 1,471,184 to Miles, one method of inserting and retaining a repair sleeve is illustrated. Miles shows expanders in either end of the sleeve which are simultaneously drawn together by a mechanical apparatus including a draw member. Packers are compressed between the sleeve and the expanders to provide sealing. The draw member is operated by turning a wing nut which can be tedious and time consuming. Removal of the draw member can also be burdensome.

In the U.S. Pat. No. 4,069,573 to Rogers, Jr. et al, the repair sleeve and damaged tube are plastically deformed by an hydraulic apparatus. According to the disclosure, an interference fit results between the repair sleeve and joint but due to their essentially equivalent elastic constants, a slight mechanical clearance, i.e., leakage, may exist. This is an unsatisfactory situation for two reasons. The first is that this apparatus is not suitable for situations where a leak proof fit is necessary. The second is that mechanical deformation of the damaged tube is undesirable and is even more undesirable when the damaged tube is constrained within a tube sheet.

In U.S. Pat. No. 2,756,779 to Tratzik et al. an expanding mandrel is utilized to expand deformable ferrules on either end of the repair sleeve. This apparatus is unsatisfactory because of the time and manpower necessary to secure the repair sleeve. The distal end of the repair sleeve is expanded first and then the whole apparatus must be reset before expanding the near end of the repair sleeve. Such a procedure is expensive in operation and is impractical when repairing a large number of tubes. It is also possible that due to the elastic component of the ferrule springing back, a leak tight seal may not be achieved. Other similar unwieldy mechanical arrangements are described in U.S. Pat. Nos. 2,731,041, 2,784,627, and 2,829,675, all to Mueller et al.

Mechanical arrangements where two expanding mandrels are drawn toward one another are shown in U.S. Pat. No. 2,517,626 to Berg and U.S. Pat. No. 4,114,654 to Richardson. Both of these arrangements would be unsatisfactory for use in securing repair sleeves since all of the individual components remain in the damaged tube, thereby severely restricting the fluid flow to an untolerable level.

U.S. Pat. No. 4,114,654 discloses a plug for a tube which comprises a deformable tubular sleeve and two tapered members positioned partially within the sleeve. The members can be drawn together by a screw thread arrangement so as to deform the sleeve outwardly into engagement with the tube to be plugged.

In conjunction with the aim to automate the sleeve repair operation, it would be desirable to deploy the sleeve repair apparatus with as little manipulation as possible.

Materials capable of possessing shape memory are well known. An article made of such materials can be deformed from an original, heat-stable configuration to a second, heat-unstable configuration. The article is said to have shape memory for the reason that, upon the application of heat alone, it can be caused to revert, or to attempt to revert, from its heat-unstable configuration to its original, heat-stable configuration, i.e. it "remembers" its original shape.

Among metallic alloys, the ability to possess shape memory is a result of the fact that the alloy undergoes a reversible transformation from an austenitic state to a martensitic state with a change in temperature. This transformation is sometimes referred to as a thermoelastic martensitic transformation. An article made from such an alloy, for example a hollow sleeve, is easily deformed from its original configuration to a new configuration when cooled below the temperature at which the alloy is transformed from the austenitic state to the martensitic state. The temperature at which this transformation begins is usually referred to as $M_s$ and the temperature at which it finishes $M_f$. When an article thus deformed is warmed to the temperature at which the alloy starts to revert back to austenite, referred to as $A_s$ ($A_f$ being the temperature at which the reversion is complete) the deformed object will begin to return to its original configuration.

Thus, in a sense, shape memory alloys can be self-actuating when exposed to a change in temperature. When these shape memory alloys promote the movement of a cooperating part, they become self-actuating drivers.

The use of shape memory alloys as self-actuating drivers has heretofore been limited to devices such as a coupling, (U.S. Pat. No. 4,149,911 to Clabburn), a steam generator tube plug (U.S. Pat. No. 3,900,939 to Greacan) and a prestressed structural joint member (U.S. Pat. No. 4,294,559 to Schutzler). As far as applicant is aware, no article has been disclosed in which the shape memory effect is utilized to axially contract a longitudinally dimensioned draw means.

SUMMARY OF THE INVENTION

In view of the above, it is an object of the invention that a repair sleeve be securely retained within a fluid carrying tube without leakage.

It is another object of the invention that the repair sleeve apparatus be capable of being deployed quickly and efficiently so as to avoid expensive labor costs.

It is a further object of the invention that the method of deploying the repair sleeve apparatus incorporate the concept of self-actuation.

Accordingly, the invention provides an assembly for securing a repair sleeve within a damaged pipe, comprising:
(a) a tubular repair sleeve, and
(b) a shape-memory alloy element positioned within the sleeve and having a mandrel on each end with at least a portion of each mandrel extending beyond the sleeve at each end thereof;
arranged so that when the shape-memory alloy element recovers, the mandrels are moved towards one another so that each end portion of the sleeve is caused to expand outwardly.

In a preferred embodiment of the assembly, the assembly includes two retention rings peripherally located with respect to the element and distally located with respect to the mandrels. In this embodiment, the element urges the retention rings and mandrels, respectively, toward each other and inwardly of the sleeve. Opposed ends of the sleeve are then expanded outwardly into engagement with an inside diameter of the damaged pipe. The retention rings are subsequently expanded outwardly into engagement with the now-expanded ends of the sleeve.

The invention also provides a method of repairing a damaged pipe, comprising:
(a) positioning the assembly of the invention with the damaged pipe;
(b) causing the shape-memory alloy element to recover so that the mandrels move towards one another and expand the end portions of the sleeve; and
(c) removing the element.

As will become more apparent hereinafter, the assembly and method of the invention achieve the various objects of the invention and incidentally also solve the problems of the prior art by the installation of a leak-tight sleeve in a quick and efficient way that is subject to automation.

BRIEF DESCRIPTION OF THE DRAWINGS

FIG. 1 is a view, partly in section, of the assembly of the invention about to be deployed;

FIG. 2 is a view, partly in section, of the assembly of the invention partly deployed;

FIG. 3 is a view, partly in section, of the assembly of the invention fully deployed;

FIG. 4 is a view of the assembly of the invention, partly in section, fully deployed with the draw means removed;

FIG. 5 is an enlarged view of the top of the draw means showing the retention means in greater detail;

FIG. 6 is a view similar to FIG. 5 but showing another embodiment of the retention means;

FIG. 7 is a further view similar to FIG. 5 but showing another embodiment of the retention means;

FIG. 8 is a further view similar to FIG. 5 but showing still another embodiment of the retention means;

FIG. 9 is a still further view similar to FIG. 5 but showing still another embodiment of the retention means;

FIG. 10 is yet another view similar to FIG. 5 but showing another embodiment of the retention means.

DETAILED DESCRIPTION OF THE INVENTION

Referring now to the figures in more detail and particularly referring to FIGS. 1 to 4, the assembly is shown in a typical working environment. A damaged pipe 4 having some form of damage such as a hole 1 is shown terminating in a tube sheet 2. In this working environment, the damaged pipe is usually accessible only through the bottom 3 of the tube sheet 2. Thus, whatever apparatus and method may be employed to repair a damaged pipe, it is only possible to work from one end. With this in mind, the invention will now be described in more detail.

Disclosed according to the invention is an apparatus for securing a repair sleeve 6 within a damaged pipe 4. In a first embodiment of the apparatus, the apparatus comprises a shape-memory alloy draw means 8 having expanding means 10, 12 on each end. The draw means 8 is contained within the sleeve 6 with at least a portion 14, 16 of each of the expanding means protruding outside of the sleeve. The draw means urges, without the application of external mechanical means, the expanding means toward one another and inwardly of the sleeve. In so doing, opposed ends 18, 20 of the sleeve are expanded outwardly, preferably sequentially, into engagement with an inside diameter 22 of the damaged pipe. In a preferred embodiment of the invention, end 20 of the sleeve will b expanded fully outwardly and then end 18 of the sleeve will be expanded fully outwardly. Without the application of external mechanical means is understood to mean the absence of mechanical arrangements for converging the expanding means such as the threaded draw member and wing nut of the aforementioned Miles patent.

As shown in the figures, the expanding means may comprise conically shaped mandrels although other shapes are contemplated within the scope of the invention. One of the mandrels is integral with the draw means and the other of the mandrels is a collapsible mandrel peripherally located with respect to the draw means. The term "integral" is interpreted to mean that the mandrel is somehow attached directly to the draw means such as by a threaded connection.

The collapsible mandrel is actually slightly stronger than the sleeve. This must be so in order to expand the sleeve. However, when a sufficient force is exerted against the collapsible mandrel, such as when further expansion of the sleeve is resisted by the tube sheet, the collapsible mandrel will collapse or become deformed. At this point, the mission of the collapsible mandrel, i.e., expansion of the sleeve, has been completed and damage to the tube sheet is avoided.

Shown inside of the collapsible mandrel is a spacer 24. The purpose of the spacer is to provide support for the collapsible mandrel.

The urging of the expanding means toward one another occurs by the contraction of the draw means in response to a transformation of the shape-memory alloy from the martensitic to the austenitic state. That is, the draw means of the invention in the martensitic state has a longer length than in the austenitic state so that upon warming the alloy through the transformation temperature, the alloy will achieve the austenitic state along with a decrease (contraction) in length associated with this state. The transformation of shape memory alloys is a well-known concept especially known to those skilled in the art. In one preferred embodiment of the invention, the transformation of the shape memory alloys utilized in the instant invention has been chosen to occur at ambient temperature. In this way, the transformation will occur solely in response to the temperature of the working environment so that the expansion o the sleeve will be self-actuated. That is, expansion of the sleeve will automatically occur after installation of the apparatus so that manual labor is unnecessary.

The draw means has an enlarged cross-sectional portion 26 proximate to one of the expanding means, in this case it is expanding means 12, such that portion 26 abuts an end 28 of the damaged pipe (or some other abutment surface which may even be the bottom of the tube sheet itself) during the urging of the expanding means toward one another. This is clearly shown in FIG. 2. The abutment of the enlarged cross-sectional portion against an end of the damaged pipe assists in tee operation of the invention as will be explained hereafter.

The apparatus further comprises a ferrule 00 peripherally with respect to one of the expanding means, either 10 or 12. For purposes of the illustration, the ferrule is peripherally located with respect to expanding means 10. That is, the ferrule generally surrounds the expanding means 10. The ferrule has a stepped outside diameter configuration. As shown in the figures, the ferrule has a larger outside diameter 32 and a smaller outside diameter 34. The larger outside diameter 32 of the ferrule will generally conform to the outside diameter 33 of the sleeve, and the smaller outside diameter 34 of the ferrule will generally conform to the inside diameter 35 of the sleeve. Because of this stepped outside diameter configuration, the ferrule is suitable for nesting with the sleeve so that upon the urging of the expanding means toward one another, the ferrule will nest with an end of the sleeve and then expand outwardly in conjunction with the expansion of the sleeve.

It is preferable that the apparatus further comprise two retention means 36, 38. These retention means are peripherally located with respect to the draw means 8 and distally located with respect to the expanding means 10, 12. In other words, retaining means 36 will be closer to the end 40 of the draw means than will the expanding means 12. Similarly, the retaining means 38 will be closer to the end 42 of the draw means than will the expanding means 10. Due to the contraction of the draw means, the retention means will be drawn toward one another and inwardly of the sleeve. However, the retention means will not enter the sleeve until the sleeve has been expanded by the expanding means. After the expansion of the sleeve, the retention means will be expanded outwardly into engagement with the now-expanded ends of the sleeve. This is clearly shown in FIGS. 3 and 4.

By expanding the retention means after the expansion of the sleeve, the retention means serve to keep the expanded ends of the sleeve in the fully expanded position. Thus, the elastic spring-back of the sleeve is prevented, which then leads to a leak-tight seal. The long-standing problem of achieving a leak-tight seal, a problem heretofore recognized in the prior art, has accordingly been solved.

In a preferred embodiment of the invention, the transformation temperature of the shape-memory alloy draw rod is chosen so as to occur at ambient temperature, that is, the temperature of the working environment. In this case, the expansion of the sleeve will be self-actuated.

In one preferred embodiment of the invention, at least one of the retention means 36 or 38 comprises a shape-memory alloy with a transformation from the martensitic state to the austenitic state occurring at ambient temperature. In this embodiment of the invention, the retention means will automatically expand outwardly upon exposure to ambient temperature so as to retain the ferrule and sleeve in their expanded position. Since this step is automatic, little manpower ned be expended. The retention means which comprises a shape-memory alloy will, most preferably, be the top retention means 38.

The collapsible mandrel 12 and the retention means 36 may be made of a single piece so that both the retention means and the mandrel will be collapsible. With both the collapsible mandrel and the retention means 36 being collapsible, their elastic component will tend to exert a force outwardly. This elastic force will counteract the spring-back of the expanded sleeve and, therefore, hold the expanded sleeve in its expanded position. It is not essential to the invention that the colapsible mandrel and retention means 36 be made from a shape memory alloy. Other alloys such as stainless steel will achieve the objects of the invention. In fact, if retention means 38 were not made from a shape memory alloy (although it is preferred that it be made from shape memory alloy), it could also be made from another aloy such as stainless steel.

It is preferred that the sleeve has seal means proximate to at least one end of the sleeve. As shown in the figures, the seal means may comprise circumferentially extending teeth 44. It is conceivable, within the scope of the invention, that the seal means may also comprise soft metal seals, braze material, or other chemical or mechanical expedients.

The functioning of the invention will now be described in greater detail. In a first position, the repair sleeve assembly comprises a shape memory alloy draw means 8 having a conically shaped mandrel 10 at each end 40, 42. There is also a collapsible conically shaped mandrel 12, expanding retention means 36, 38, and an annular repair sleeve 6. The repair assembly in a first position will have the collapsible mandrel 12 peripherally located with respect to the draw means 8 and, at the same time, the collapsible mandrel will be proximate to the opposed end 40 of the draw means. Also, the repair sleeve assembly will have the retention rings peripherally located with respect to the draw means and distally located with respect to the mandrels.

In a second position, the repair sleeve assembly will have the draw means contained within the sleeve with at least a portion of each of the mandrels, as shown by 14 and 16 of FIG. 1 of the drawings protruding outside the sleeve.

In a third position, as also shown by FIG. 1, the repair sleeve assembly is inserted within the damaged pipe 4 with at least a portion of the collapsible mandrel 12 remaining outside the damaged pipe.

In a fourth position, as most clearly shown by FIG. 2, the repair sleeve assembly will have the collapsible mandrel 12 converged toward the draw means mandrel 10 without the application of external mechanical means, i.e., without the necessity of mechanical (including hydraulic) force being applied to the assembly by some means outside the assembly. Necessarily, the mandrels are urged inwardly of the sleeve while simultaneously expanding opposed ends of the sleeve outwardly into engagement with the damaged pipe. In this position, the assembly is partly deployed. Preferably the opposite ends of the sleeve are expanded outwardly sequentially into engagement with the damaged pipe, end 20 first and then end 18. This sequential expanding is achieved by designing the assembly so that less force is needed to urge the collapsible mandrel 12 inwardly and expand end 20 of the sleeve outwardly than is needed to urge draw means mandrel 10 inwardly and expand end 18 of the sleeve outwardly. The effect of this is important. When the collapsible mandrel 12 becomes fully engaged in expanded end 20 of the sleeve, further inward movement of the collapsible mandrel is prevented by means as discussed hereafter. Then the only way that the draw means mandrel can converge toward the collapsible mandrel is to move inwardly of the sleeve. When so moved inwardly of the sleeve, it will expand end 18 of the sleeve outwardly into its fully expanded position. Upon full expansion of end 18 of the sleeve, the draw means mandrel will have moved through the expanded end 18 of the sleeve as shown in FIG. 3. The assembly is sized so that the draw means mandrel can move past expanded end 20 of the sleeve without binding.

In a fifth position, as also shown in FIG. 2, the repair sleeve assembly will have the retention rings 36, 38 expand outwardly into engagement with the now expanded ends of the sleeve.

In the fifth position, the repair sleeve assembly has the draw means disengaged from the assembly. FIG. 3 shows the assembly fully deployed with the draw means withdrawing from the assembly. The draw means is now completely past the most inward end 18 of the sleeve which has just been expanded. FIG. 4 shows the repair sleeve assembly fully deployed with the draw means completely disengaged from the assembly. The assembly is sized so that once the draw means mandrel has expanded the most inward end 18 of the sleeve, it will be able to pass the near end 20 of the already expanded sleeve without difficulty.

As noted in the drawings, FIGS. 1 to 3, there is also fixture 45 which is attached to the bottom 3 of the tube sheet 2 either magnetically or by an adhesive material. The purpose of this fixture is to locate the repair sleeve assembly properly with respect to the damaged pipe. As shown in FIG. 1, the enlarged cross-sectional portion 26 rests on surface 46 of the fixture 4.. When the fixture 45 is properly dimensioned, the sleeve, draw means and expanding means, as well as the other elements of the invention, will all be in the correct position prior to actuation of the draw means. Once the repair sleeve assembly is fully deployed the fixture is then removed as shown in FIG. 4.

Referring now to FIGS. 5 through 8, and particularly referring to FIG. 5, there is illustrated in greater detail the operation of the retention means 38 of FIGS. 1 to 4. At this stage of the deployment of the invention, the draw means mandrel 10 has already expanded end 18 of the sleeve 6 and ferrule 30. The direction of movement of the draw means 8 is toward the bottom of the paper.

The next step is the positioning of retention means 38. As the draw means moves downwardly, shoulder 48 of the retention means abuts against end 50 of the ferrule and further downward movement of the retention means is prevented. However, the draw means continues to move downwardly.

As the draw means moves downwardly, surface 52 of the draw means moves against surface 54 of the retention means. While surface 52 can be formed integrally with the draw means, it can more economically be formed as a part of tube 53 which can then be threaded onto the draw means. Since surface 54 is initially bent inwardly, downward movement of surface 52 will cause surface 54 to be bent outwardly. In turn, surface 56 is moved outwardly to a second position 56', shown in dotted lines. Since the retention means abuts the ferrule on the top and is wrapped around the ferrule on the bottom, the retention means thus become locked into position around the ferrule.

If the retention means comprises a shape memory alloy, the retention means, after transformation from the martensitic state to the austenitic state, will attempt to expand outwardly against the ferrule and end 18 of the sleeve. The outwardly directed force resulting from the shape memory effect of the retention means is sufficient to prevent elastic springback of the ferrule and end 18 of the sleeve.

It should be noted that the ferrule serves a very useful purpose. Once the draw means mandrel moves past the now-expanded ferrule, there is no chance that the draw means mandrel can bind on the inside diameter of the sleeve. The ferrule thus provides a means to expand the end of the sleeve and also a clearance for the movement of the draw means mandrel.

It has been found that the invention can be more effectively deployed if the ends 18 and 20 of the sleeve are made thinner in cross-section then the remainder of the sleeve. The expansion of the ends of the sleeve, are, of course, more easily accomplished when this is the case.

Seal means 44 are more readily visible in FIG. 5. In conjunction with the expansion of the end of the sleeve, the circumferentially extending teeth bite into the damaged pipe. The result is a leak-tight seal.

Another embodiment of the retention means is illustrated in FIG. 6. As was the case with the previous embodiment of the retention means, the draw means mandrel 10 has moved past the ferrule 30 and end 18 of the sleeve. Downward movement of the draw means 8 causes shoulder 48 to abut end 50 of the ferrule.

In this embodiment, however, the retention means is held onto the draw means by collapsible spring 58 which sits in groove 60.

As the draw means continues to move downwardly, further movement downward of the retention means is impossible. Rather, the downward pull of the draw means and the resistance of the retention means is sufficient to cause collapsible spring 58 to collapse further into groove 60. Then, the draw means with the collapsed spring is able to move down through and past the retention means.

Again, if the retention means comprises a shape memory alloy, the outwardly directed force due to the recovery of the shape memory alloy will prevent elastic springback of the ferrule and end 18 of the sleeve.

FIG. 7 is a further embodiment of the retention means. This embodiment is similar to the FIG. 6 embodiment except frangible cap 62 holds the retention means onto the draw means. The frangible cap 62 may be made of any frangible material including but not limited to plastic.

After shoulder 48 of the retention means abuts end 50 of the ferrule, the draw means will continue to attempt to move downwardly. When the downward pull of the draw means is sufficient to overcome the strength of the frangible cap, the frangible cap will fracture 64 and become free of the draw means. Then the retention means will be released from the draw means and the draw means can continue its downward travel.

A still further embodiment of the retention means is illustrated in FIG. 8. In this embodiment, the ferrule is unnecessary.

There is a retention means cap 66 comprising a threaded connection to the draw means and retention means 38. In this case, downward movement of the draw means will cause shoulder 68 of the retention means cap to abut end 70 of the sleeve. Further downward movement of the draw means will, of course, be resisted by the retention means cap. However, when the downward pull of the draw means is sufficient to overcome the strength of the retention means cap, the retention means cap will fracture 72 and release the retention means. The retention means cap may include notches 74 to promote the fracturing of the retention means cap.

After the retention means is released, the draw means may continue downwardly unimpeded.

As with the previous embodiments of FIGS. 5 through 7, if the retention means cap and retention means comprise a shape memory alloy, the outwardly directed force due to the recovery of the shape memory alloy will prevent elastic springback of the end 18 of the sleeve Yet another embodiment of the retention means is illustrated in FIG. 9. In this embodiment also, the ferrule is unnecessary.

Any of the retention means of FIGS. 5 to 8 may be used with the embodiment of FIG. 9. In the embodiment shown, the retention means of FIG. 8 is used. In this embodiment downward movement of the draw means will cause the draw means mandrel 10 to directly expand the end 18 of the sleeve.

As the draw means continues downwardly, shoulder 68 of retention means 38 will abut end 70 of the sleeve. As described previously in connection with FIGS. 5 to 8, further downward movement of the draw means will cause the retention mean to become disengaged from the draw means.

In order to provide clearance for the continued downward movement of the draw means mandrel, the sleeve is undercut just below seal means 44.

A further embodiment of the retention means in which the ferrule is unnecessary is illustrated in FIG. 10.

Again, as the draw means continues downwardly, shoulder 68 of retention means 38 will abut end 70 of the sleeve. As described previously in connection with FIGS. 5 to 9, further downward movement of the draw means mandrel 10 will cause the retention means to become disengaged from the draw means In this embodiment, however, there is a two-step expansion of the sleeve. The first step in the expansion is when the retention means and the mandrel, together, enter end 18 of the sleeve to partially expand the sleeve end outwardly. The second step in the expansion occurs after the retention means shoulder abuts the end of the sleeve. In the second step, the further downward movement of the draw means mandrel causes the retention means to expand outwardly and the sleeve end to expand further outwardly. The second step expansion is aided by the movement of the draw means mandrel conical surface 72 against retention means conical surface 74.

Once the draw means mandrel passes the retention means on its downward movement, there will be ample clearance between the draw means mandrel and the sleeve.

An important advantage of this embodiment is that when a shape-memory alloy retention means is utilized, the stress applied after recovery of the shape memory alloy will be constant, regardless of the tolerance of the inside diameter of the tube. Thus, the optimum stress can be determined that will be sufficient for sealing purposes but will be insufficient to initiate stress corrosion cracking of the sleeve and tube.

It should be noted that in this embodiment, sealing means on the sleeve outside diameter are not necessary.

The method of the invention may include a step in which the repair apparatus assembly is cryogenically cooled. It should be understood that "cryogenically cooled" means that the entire repair apparatus assembly is immersed for a sufficient period of time in liquid nitrogen. This step is necessary to transform the shape memory alloy into the martensitic condition.

The next step is the inserting of the repair apparatus assembly in the damaged pipe followed by warming the repair apparatus assembly. Warming is, of course, necessary to activate the shape memory effect which arises from the transformation of the shape memory alloy from the martensitic state to the austenitic state.

A further step is converging the expanded means without the application of external mechanical means. This step is an integral part of the self-actuation of the mechanism.

The method further comprises engaging the expanding means with the ends of the sleeve. As the expanding means continue to move or continue to converge and the degree of engagement with the ends of the sleeve increases, the ends of the sleeve become expanded outwardly into engagement with the damaged pipe.

The final step of the method is removing the draw means. At this point, the sleeve is fully installed and a leak-tight seal is obtained. Thus the damaged pipe is repaired by the method of this invention.

It is preferred that the step of warming comprises exposing the repair apparatus assembly to the ambient temperature.

The method need not include the steps of cryogenically cooling. In this case, shape-memory alloys can be used that have a higher martensite transformation temperature such that cooling in liquid nitrogen is unnecessary. However, since it may be a requirement of these alloys that they not be martensitic after installation at or near ambient temperature, it will nevertheless be necessary to cool certain of these alloys in some medium such as cooled alcohol in order to promote the martensitic transformation but this step of cooling may be accomplished at the time of manufacture instead of prior to installation. Simultaneously, these same shape-memory alloys can have either a permanent or temporary austenite transformation temperature above ambient temperature, as will become apparent hereafter. The step of warming, then, in this embodiment requires warming to a temperature above ambient temperature.

It is also preferred that the step of expanding the ends of the sleeve comprises fully expanding one end of the sleeve and then fully expanding the other end fo the sleeve in sequence.

Throughout the specification, the use of shape-memory alloys for the draw means and retention means has been described. Many of the well-known shape-memory alloys already known to those skilled in the art are suitable for use with the instant invention. However, a particularly preferred alloy for the draw means is the nickel/titanium/iron alloy disclosed in the Harrison et al. U.S. Pat. No. 3,753,700, which is hereby incorporated by reference. It is preferred that the alloy be processed according to the method disclosed in U.S. Pat. No. 4,502,896.

A preferred alloy for the retention means is the nickel/titanium/vanadium alloy disclosed in U.S. Pat. No. 4,505,767 processed according the method disclosed in U.S. Pat. No. 4,533,411; the disclosure of each of these documents is incorporated herein by reference.

An important point to mention here, a point already apparent to those skilled in the art, is that many of the alloys suitable for use with the instant invention including the above iron and vanadium alloys have an $M_s$ temperature below ambient temperature. Thus, when the instant invention calls for a shape-memory alloy, it is understood that the part embodying that shape-memory alloy must be cooled prior to installation to some temperature below the $M_s$ temperature in order to transform that part into the martensitic condition. Cooling the part individually should be satisfactory. However, it has been found that when the draw means comprises shape-memory alloys, cooling of the whole repair sleeve assembly is preferred. It is also preferred that cooling be by immersion in liquid nitrogen. This step has been alluded to in the description of a preferred embodiment of the method of the invention.

In order to effectuate the objects of the invention, the $M_s$ temperature of the retention means should be greater than the $M_s$ temperature of the draws. This insures that the draw means will transform first from the martensitic state to the austenitic state and cause the expansion of the sleeve prior to the expansion of the retention means. If the reverse occurred, the whole apparatus will lock up and effectively plug the tube.

In another aspect of the invention, shape-memory alloys may be used for the draw means and the retention means which have an $A_s$ temperature above ambient such that the shape-memory alloy has to be heated to effect the transformation from the martensitic state to the austenitic state. When this is the case, a suitable heating means may be provided. For example, if a hollow draw means were to be utilized, then a suitable heat source may be inserted within the draw means to supply the heat necessary to effect the transformation. Or, if the draw means was solid, when a suitable heat source may be wrapped around the draw means.

In this aspect of the invention, the objects of the invention will be best achieved when the $A_s$ temperature of the retention means is higher than the $A_s$ temperature of the draw means. So that the retention means retains its strength after being installed, it should remain in the austenitic condition. This being the case, the $M_s$ temperature of the retention means should be below ambient temperature. On the other hand, since the draw means is removed from the assembly after installation, its $M_s$ temprature is not so critical and may, in fact, be above room temperature.

It can be appreciated that since these shape-memory alloys have an $A_s$ temperature above ambient temperature, no on-site cooling prior to installation is required. Thus, the apparatus may be fabricated and assembled at the point of manufacture and then shipped to the place of installation while in the martensitic condition. Once the apparatus has been carefully positioned in its intended environment, heat is applied to effect the transformation to austenite.

What is claimed is:

1. An assembly for securing a repair sleeve within a damaged pipe, comprising:
   (a) a tubular repair sleeve, and
   (b) a shape memory alloy element positioned within the sleeve and having a mandrel on each end with at least a portion of each mandrel extending beyond the sleeve at a respective end of the sleeve; arranged so that when the shape memory alloy element recovers, the mandrels are moved towards one another so that each end portion of the sleeve is caused to expand outwardly.

2. An assembly as claimed in claim 1, which includes two retention rings, each positioned around the element towards a respective end of the sleeve, the retention rings being expandable to engage the expanded end portions of the sleeve.

3. An assembly as claimed in claim 2, in which the retention rings comprise a shape memory alloy arranged so that the rings expand radially outwardly on recovery.

4. An assembly as claimed in claim 1, in which one of the mandrels is arranged to collapse radially after expansion of the end portions of the sleeve.

5. An assembly as claimed in claim 1, in which the dimensions of the mandrels and the sleeve, are so arranged that the ends of the sleeve are expanded sequentially.

6. An assembly as claimed in claim 1, in which the sleeve has means, towards at least one end of the sleeve, for forming a seal between the repair sleeve and the internal surface of a damaged pipe.

7. An assembly as claimed in claim 1, which includes a ferrule peripherally located with respect to one of said mandrels, the ferrule having a stepped outside configuration suitable for nesting with the sleeve so that upon the urging of the mandrels toward one another, the ferrule nests with an end of the sleeve and expands outwardly in conjunction with the expansion of the sleeve.

* * * * *